(12) United States Patent
Chauhan (10) Patent No.: US 11,729,262 B2
(45) Date of Patent: *Aug. 15, 2023

(54) ENABLING ANALYTICS FOR A VIRTUALIZED APPLICATION

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,621

(22) Filed: Jun. 20, 2022

(65) Prior Publication Data

US 2022/0321648 A1    Oct. 6, 2022

Related U.S. Application Data

(63) Continuation of application No. 17/191,671, filed on Mar. 3, 2021, now Pat. No. 11,399,057.

(51) Int. Cl.
| | | |
|---|---|---|
| *G06F 15/173* | (2006.01) | |
| *H04L 67/1023* | (2022.01) | |
| *H04L 67/1025* | (2022.01) | |
| *H04L 67/1029* | (2022.01) | |
| *H04L 67/1036* | (2022.01) | |
| *H04L 67/1031* | (2022.01) | |

(52) U.S. Cl.
CPC ...... *H04L 67/1023* (2013.01); *H04L 67/1025* (2013.01); *H04L 67/1029* (2013.01); *H04L 67/1031* (2013.01); *H04L 67/1036* (2013.01)

(58) Field of Classification Search
CPC ............. H04L 67/1023; H04L 67/1025; H04L 67/1029; H04L 67/1031; H04L 67/1036
USPC .................................................. 709/223–226
See application file for complete search history.

(56) References Cited

U.S. PATENT DOCUMENTS

| | | | |
|---|---|---|---|
| 8,078,649 B2 * | 12/2011 | Shlomai ................ H04L 67/133 709/223 |
| 8,949,825 B1 * | 2/2015 | Fitzgerald ........... G06F 9/45537 718/1 |
| 9,973,538 B2 * | 5/2018 | Duan ...................... H04L 67/75 |
| 11,399,057 B1 * | 7/2022 | Chauhan ............. H04L 67/1036 |

(Continued)

*Primary Examiner* — Bharat Barot
(74) *Attorney, Agent, or Firm* — Barta, Jones & Foley, PLLC (57) ABSTRACT

Solutions for enabling analytics for a virtualized application leverage reproducibility of information as a substitute for persisting information. Disclosed solutions include: collecting, by a virtualized application, first analytics data on a user equipment (UE); performing, by the virtualized application, a one-way function (e.g., a hash function) on persistent information (e.g., an international mobile equipment identity (IMEI) number) on the UE to generate a unique UE identification (ID); transmitting the first analytics data and the UE ID to a remote node across a network; collecting, by the virtualized application, second analytics data on the UE; and transmitting the second analytics data and the UE ID to the remote node across the network. Because the UE ID is deterministic, it may be generated repeatedly, as needed, (producing the same value each time) to compensate for the inability of the virtualized application to persist the UE ID on the UE.

20 Claims, 6 Drawing Sheets

(56) References Cited

U.S. PATENT DOCUMENTS

| | | | | |
|---|---|---|---|---|
| 11,411,839 B1* | 8/2022 | Sandhu | ................ | H04L 67/535 |
| 2011/0270963 A1* | 11/2011 | Saito | ................... | G06F 11/302 |
| | | | | 709/224 |

* cited by examiner

ENABLING ANALYTICS FOR A VIRTUALIZED APPLICATION

CROSS-REFERENCE TO RELATED APPLICATION

This application is a continuation application of and claims priority to U.S. patent application Ser. No. 17/191,671, entitled "ENABLING ANALYTICS FOR A VIRTUALIZED APPLICATION," filed on Mar. 3, 2021, the disclosure of which is incorporated herein by reference in its entirety.

BACKGROUND

Virtualized applications (apps), such as instant play apps and App Clips™ permit users to access functionality of smartphone apps, but without requiring the user to actually install an application in the user equipment (UE, e.g., smartphone). Implementations may involve executing the virtualized application on cloud resource hardware and displaying screens from that execution on the UE via an internet browser. Although this may be beneficial for users, there are drawbacks: the virtualized applications may have severe size limitations, limiting functionality, and data resulting from the user's interaction with the virtualized application is generally not persisted. For providers of virtualized applications, this limited size and functionality, and lack of persisting data, may introduce challenges.

SUMMARY

The following summary is provided to illustrate examples disclosed herein but is not meant to limit all examples to any particular configuration or sequence of operations.

Solutions for enabling analytics for a virtualized application leverage reproducibility of information as a substitute for persisting information. Disclosed solutions include: collecting, by a virtualized application, first analytics data on a user equipment (UE); performing, by the virtualized application, a one-way function (e.g., a hash function) on persistent information (e.g., an international mobile equipment identity (IMEI) number) on the UE to generate a unique UE identification (ID); transmitting the first analytics data and the UE ID to a remote node across a network; collecting, by the virtualized application, second analytics data on the UE; and transmitting the second analytics data and the UE ID to the remote node across the network. Because the UE ID is deterministic, it may be generated repeatedly, as needed, (producing the same value each time) to compensate for the inability of the virtualized application to persist the UE ID on the UE.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Analytics functionality, which measures software application performance in order to improve user experience, often requires that collected analytics data (e.g., information regarding usage and performance of the software application) be uniquely identified according to the UE on which it is executing. Additionally, analytics functionality tends to be large and so may exceed a size budget for an executable file. These limitations curtail the ability to collect analytics data from virtualized applications.

Solutions for enabling analytics for a virtualized application leverage reproducibility of information as a substitute for persisting information. Disclosed solutions include: collecting, by a virtualized application, first analytics data on a user equipment (UE); performing, by the virtualized application, a one-way function (e.g., a hash function) on persistent information (e.g., an international mobile equipment identity (IMEI) number) on the UE to generate a unique UE identification (ID); transmitting the first analytics data and the UE ID to a remote node across a network; collecting, by the virtualized application, second analytics data on the UE; and transmitting the second analytics data and the UE ID to the remote node across the network.

Aspects of the disclosure improve the operation of computer networks by enabling analytics for virtualized applications by performing, by a virtualized application, a one-way function on persistent information on a UE to generate a unique UE ID. Because the UE ID is deterministic, it may be generated repeatedly, as needed, (producing the same value each time) to compensate for the inability of the virtualized application to persist the UE ID on the UE. This ability to deterministically recreate the UE ID each time it is needed overcomes the disadvantage of not being able to persist the UE ID on a UE with a virtualized application.

Aspects of the disclosure operate in an unconventional manner, for example, by implementing a listener component within a light application (which is executed in a virtualization environment, remote from the UE, as the virtualized application), rather than merging a full analytics component into a full installed application. Because virtualized applications are typically constrained, not only by size, but also by function, due to the remote execution in the virtualization environment, not all of the data collection and reporting capabilities of common full analytics components are supported. The listener, which has limited data collection capabilities, may be implemented as a slave application to the virtualized application, and has functionality limited to what is permitted for virtual application execution. Thus, the listener is smaller than a common full analytics component. This facilitates the light application fitting within the size constraints.

Analytics data captured by the listener is associated with the UE ID (e.g., by being transmitted with the UE ID) to a remote node hosting analytics server. As the remote node (remote from the UE) collects the received analytics data (indexed with the UE ID), reports using multiple instances of analytics data received from multiple different transmissions may be generated, because all of the received data sets are identifiable as coming from the same UE. Even if the user installs a full application, the same UE ID may be used (although it may be persisted on the UE by the installed application) in order to provide continuity in the analytics reports that post-installation analytics data is coming from the same UE as pre-installation analytics data.

Further aspects of the disclosure permit contextual behavior of virtualized applications. For example, if a user is performing a search (e.g., searching on a service provider's website) based on some criteria (e.g., product type, location, service type, service coverage), the virtualized application may perform a query of the UE to identify various aspects of the UE. The query result may include, for example, device capabilities, network type, location and profile information stored on the device (e.g., UE make, UE model, a UE operating system (OS) version, a mobile country code (MCC), a mobile network code (MNC), and a location area code (LAC)). The query result, along with information regarding the user's search (e.g., keywords, cookies, tracked browsing history) may be provided to a context function that identifies relevant functionality in the virtualized application (or products or services) that may be of specific interest to the user.

The relevant functionality in the virtualized application may then be made available to the user in the virtualized application. For example, if a user has an older UE, and is searching for newer UE products, a promotion for new UE products may be provided. Or, if the UE is currently being serviced by one cellular carrier, and is searching cellular coverage maps, a promotion for changing to a different cellular carrier may be provided. This capability is now available, using the disclosure, without requiring the user to install an application on the UE. In this manner, user experience with the virtualized application may be differentiated based on the type of device used, the network being used, and the user's wireless carrier.

Figure 1:
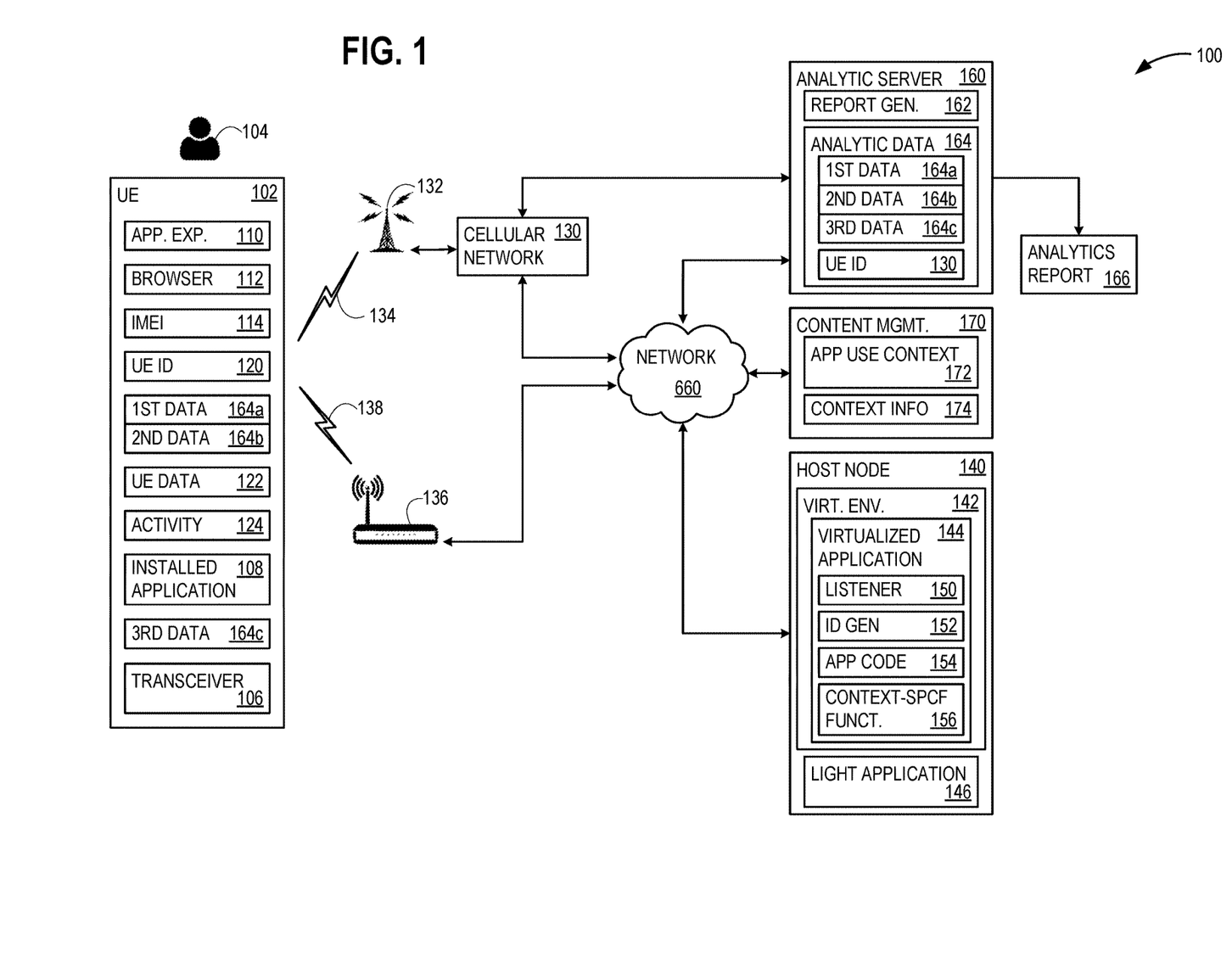
FIG. 1 illustrates an exemplary arrangement that advantageously enables analytics for virtualized applications.

With reference now to the figures, FIG. 1 illustrates an exemplary arrangement 100 that advantageously enables analytics for a virtualized application 144. In arrangement 100, user 104 uses UE 102 to control execution of virtualized application 144 that actually executes on a host node 140, rather than on UE 102 itself. This precludes an immediate need to install a full version application (e.g., an installed application 108 on UE 102, although user 104 may already have installed application 108 on UE 102, or may prefer to install installed application 108 on UE 102 at a later time, after testing virtualized application 144.

Host node 140 has a virtualization environment 142 that intakes a light application 146, which is a software package version of installed application 108 that may have been modified (relative to installed application 108) in order to meet file size and execution limitations. For example, whereas installed application 108 may exceed 15 megabytes (MB) and use background networking, light application 146 may be reduced to smaller 10 MB and have background networking functionality removed. When virtualization environment 142 begins a virtualization session for user 104, virtualization environment 142 intakes light application 146 and creates an instance of light application 146 as virtualized application 144 for execution within virtualization environment 142. In some examples, this occurs by user 104 directing a browser 112 to a website linked to host node 140 and performing some action at the website to trigger host node 140 to begin executing virtualized application 144.

User 104 interacts with virtualized application 144 as application experience 110, which is displayed on UE 102. Virtualized application 144 transmits screens for display as application experience 110, and intakes input within application experience 110 from user 104. UE 102 uses a transceiver 106 to communicate over a network 660 with host node 140, which is where virtualized application 144 is actually executing within virtualization environment 142. Network 660 may be, for example, the internet, and is described further in relation to FIG. 6. UE reaches network 660 through a cellular network 130, via an air interface 134 to a base station 132, or through a router 136 (e.g., a WiFi router), via an air interface 138. UE 102 also communicates over network 660 with an analytics server 160 (a remote node), and a content management node 170 (anther remote node). It should be understood that other networking routes may be used.

Figure 2:
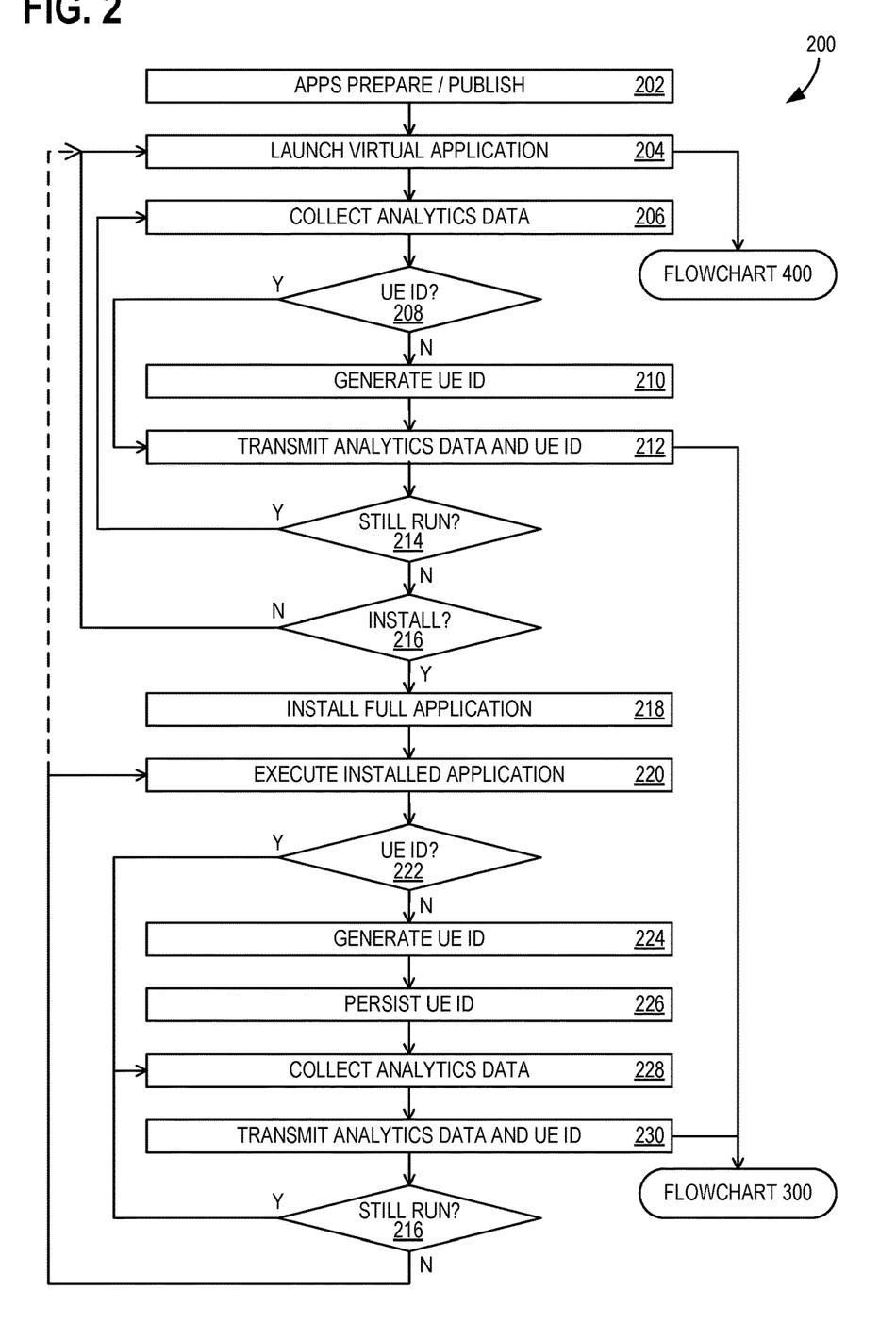
FIG. 2 illustrates a flowchart of exemplary operations that may be associated with examples of the arrangement of FIG. 1.
Figure 3:
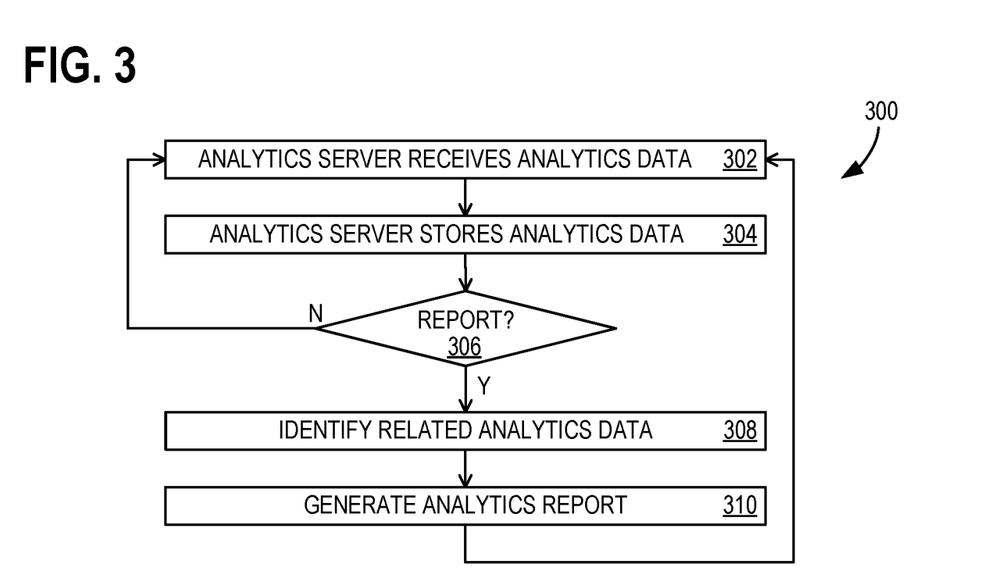
FIG. 3 illustrates another flowchart of exemplary operations that may be associated with examples of the arrangement of FIG. 1.
Figure 4:
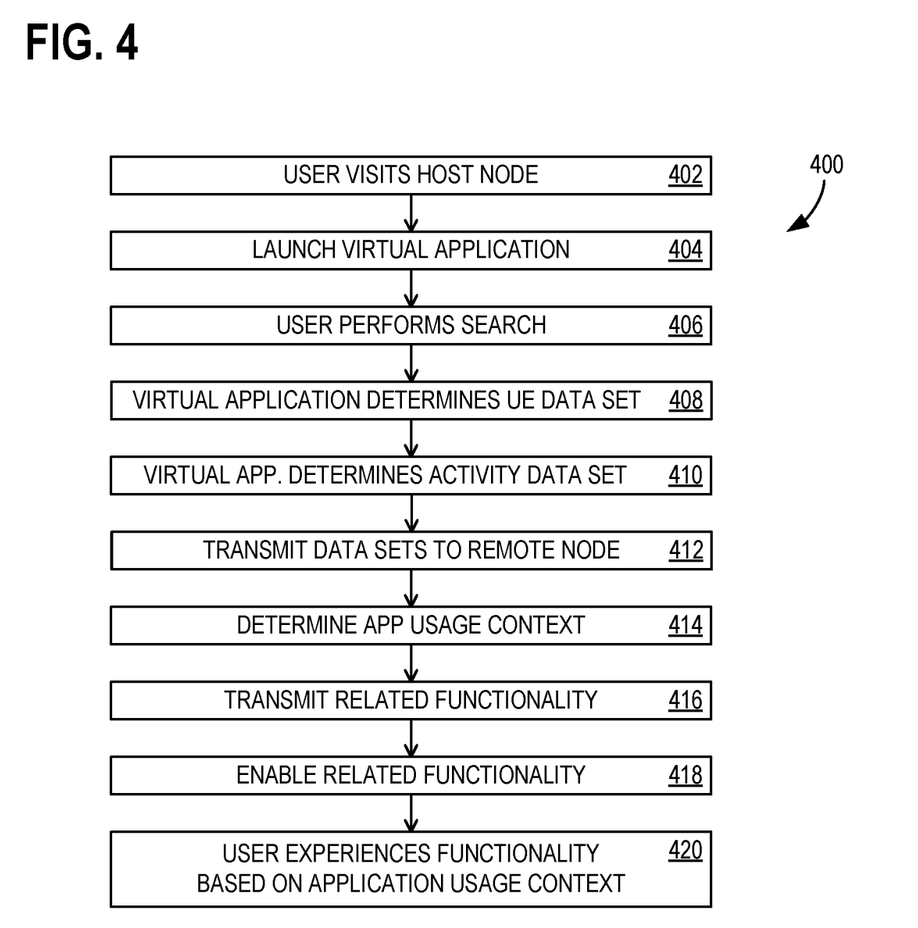
FIG. 4 illustrates another flowchart of exemplary operations that may be associated with examples of the arrangement of FIG. 1.

Arrangement 100 will be further described in relation to flowcharts 200, 300, and 400 of FIGS. 2, 3, and 4, respectively. FIG. 2 illustrates a flowchart 200 of exemplary operations associated with enabling analytics for a virtualized application. In some examples, at least a portion of flowchart 200 may each be performed using one or more computing devices 600 of FIG. 6.

In operation 202 of FIG. 2 an application developer develops a full application (which will become installed application 108) that may have a full analytics component. This renders installed application 108 unsuitable for virtualized execution within virtualized application at host node 140, in some scenarios. Thus, the application developer also makes light application 146 with listener 150 (shown within virtualized application 144, which is the executing version of light application 146). Light application 146 is a simplified version of installed application 108 that fits within size limit constraints enforced by virtualization environment 142 and does not waste executable file size on impermissible or unsupported functionality.

Listener 150 provides a light version of analytics functionality, such as identifying a screen being displayed to user 104, control actions (e.g., button and/or hyperlink clicks) and capturing limited transaction information. This user activity is indicated as activity data set 124 and may include a search term entered by user 104 in a search window, stored cookies, and a tracked browsing history. Other information that may be captured includes an IMEI 114, and a UE data set 122 that includes UE make, UE model, a UE OS version, an MCC, an MNC, and an LAC. Installed application 108 and Light application 146 are published for access (e.g., downloading for installed application 108 and virtualized execution for light application 146).

At 204, user 104 visits host node 140 with networking functionality (e.g., browser 112 or other networking functionality built into an application) on UE 102 to use virtualized application 144. Virtualized application 144 is launched and begins executing in virtualization environment 142, in operation 204. At this point, user 104 may employ virtualized application 144 in a manner that activates contextual application behavior according to flowchart 400, as described below in relation to FIG. 4. If so, flowchart 400 executes in parallel with operations 204-214 of flowchart 200.

At 206, listener 150, within virtualized application 144, collects analytics data on UE 102. In some examples, the analytics data comprises at least one data item selected from the list consisting of: a screen with which user 104 is interacting, transaction information, identification of hyperlinks selected, and usage time. The first pass through operation 206, virtualized application 144 collects first analytics data 164a on UE 102. During a subsequent pass through operation 206, described below, virtualized application 144 collects second analytics data 164b on UE 102.

As noted above, the analytics data has more value when multiple collections are correlated with a common UE. So, some identifying information that may be uniquely tied to UE 102 (even if anonymously) is needed. However, in some examples, virtualized application 144 is unable to persist information on UE 102. A substitute for persisting information, so that it is available for use at a later time, is generating information deterministically, so that a later generation event will produce the same value. However, while virtualized application 144 remains executing, an initial generation of the identifying information for UE 102 may still be within memory. If it is, this is detected by decision operation 208. If not, the identifying information for UE 102 will need to be re-created.

Operation 210 includes performing, by virtualized application 144, a one-way function on persistent information on UE 102 to generate a unique UE ID 120. In some examples, the one-way function comprises a hash function (e.g., an MD5 or a SHA function). In some examples, the persistent information comprises an IMEI 114 of UE 102. By using a one-way function, the identity of UE 102 (and the privacy of user 104) is protected. By using IMEI 114, along with a one-way function that is designed to minimize the risk of a collision, UE ID 120 will be unique to UE 102. The one-way function is performed by ID generator 152 (shown as executing within virtualized application 144 but programmed into light application 146). In some examples, different persistent information and/or a different one-way function may be used.

However, in some examples the analytics functionality may benefit from also identifying which virtualized application is being run by UE 102, specifically, identifying between virtualized application 144 and another virtualized application. In some examples, virtualized application 144 provides an application code 154 (unique to virtualized application 144) that may be included within analytics data (e.g., first analytics data 164a, second analytics data 164b, and third analytics data 164c) and/or included within the one-way function generation of UE ID 120. In some examples, operation 210 includes performing the one-way function on the persistent information (e.g., IMEI 114) on UE 102 to generate UE ID 120 comprises combining the persistent information on UE 102 with application code 154 provided by virtualized application 144.

With UE ID 120 available (either from operation 210, or still in memory, as detected by decision operation 208) the analytics data may be sent to analytics server 160. In this first pass, operation 212 includes transmitting first analytics data 164a and UE ID 120 to a remote node (e.g., analytics server 160) across network 660. During a subsequent pass, operation 212 includes transmitting second analytics data 164b and UE ID 120 to the remote node (e.g., analytics server 160) across network 660. This makes analytics data 164 available at analytics server 160, and analytics server 160 is able to generate analytics reports using analytics data 164 and an analytics report generator 162, as described below for flowchart 300, with reference to FIG. 3. As illustrated, analytics data 164 includes first analytics data 164a, second analytics data 164b, and third analytics data 164c. Second analytics data 164b and third analytics data 164c will be sent at a later time, as described below. Analytics data 164 stores first analytics data 164a, second analytics data 164b, and third analytics data 164c all indexed to (or otherwise indicated as relating to) UE ID 120, and by extension all indicated as relating to the same UE 102.

If virtualized application 144 is still running, as determined in decision operation 214, flowchart 200 may return to operation 206 to collect further analytics data (e.g., second analytics data 164b). Otherwise, user 104 may choose to install installed application 108 or re-run virtualized application 144 at a later time. If user 104 re-runs virtualized application 144 at a later time, rather than installing installed application 108, flowchart 200 returns to operation 204. This time, however, UE ID 120 may have been lost from memory on UE 102, and so decision operation 208 routes flowchart 200 to operation 210, which now includes, after transmitting first analytics data 164a and UE ID 120 to analytics server 160 across network 660, and prior to transmitting second analytics data 164b and UE ID 120 to the remote node across the network, performing, by virtualized application 144, the one-way function on the persistent information on UE 102 to generate UE ID 120 a second time. Operation 212 now includes transmitting second analytics data 164b and UE ID 120 to analytics server 160 across network 660.

If, however, user 104 does decide to install installed application 108 on UE 102 (at decision operation 216), the installation occurs in operation 218. User 104 is then able to execute installed application 108 on UE 102 in operation 220. Initially, UE ID 120 will not be available on UE 102, because it has not yet been stored. This condition is identified by decision operation 222, although in later passes, decision operation 222 will pick up that UE ID 120 has been stored on UE 102. In some examples, installed application 108 has functionality that is equivalent to ID generator 152, at least to the extent that it is able to generate the same UE ID 120, using the same persistent information and/or application code 154. In some examples, a different application code may be used between light application 146 and installed application 108 so that analytics report generator 162 is able to distinguish between user behavior on virtualized application 144 and installed application 108.

Operation 224 includes, after transmitting first analytics data first 164a (and possibly also after transmitting second analytics data 164b) and UE ID 120 to analytics server 160 (e.g., a remote node) across network 660, and prior to transmitting third analytics data 160c and UE ID 120 to analytics server 160 across network 660, performing, by installed application 108, the one-way function (e.g., an equivalent to ID generator 152) on the persistent information (e.g., IMEI 114) on UE 102 to generate UE ID 120. Operation 226 includes persisting, by installed application 108, UE ID 120 on UE 102. On subsequent passes through decision operation 222, UE ID 120 should be found on UE 102, precluding he need to redo operations 224 and 226.

At 228, installed application 108 is able to collect third analytics data 164c on UE 102. Operation 228 includes collecting, by installed application 108, third analytics data 164c on UE 102. Installed application 108 may be free of some of the size and functionality constraints to which virtualized application 144 was subject, and so third analytics data 164c may have more information than first analytics data 164a and second analytics data 164b. Operation 230 includes transmitting third analytics data 164c and UE ID 120 to analytics server 160 across network 660. If installed application 108 is still running, decision operation 232 returns flowchart 200 to operation 228 to collect further analytics data.

If user 104 has shut down installed application 108, in some examples, user 104 has the option to later either use installed application 108 (flowchart 200 returns to operation 220) or use virtualized application 144 again (flowchart 200 returns to operation 204).

FIG. 3 illustrates a flowchart 300 of exemplary operations associated with enabling analytics for a virtualized application. In some examples, at least a portion of flowchart 300 may each be performed using one or more computing devices 600 of FIG. 6. Analytics server 160 receives analytics data and UE ID 120 in operation 302. Initially, this is first analytics data 164a, but in later passes, it is second analytics data 164b and third analytics data 164c. Analytics server 160 stores the received analytics data associated with UE ID 120 at 304. In the various passes, operation 304 includes storing first analytics data 164a and second analytics data 164b both indexed to UE ID 120, and storing third analytics data 164c indexed to UE ID 120.

A decision operation 306 determines whether a report generation has been triggered, such as a periodic report (e.g., based on a timer), or a user has requested a report. If not, flowchart 300 returns to operation 302 and analytics server 160 continues collecting and storing received analytics data. However, upon a report generation trigger, operation 308 includes, based on at least UE ID 120, identifying that first analytics data 164a and second analytics data 164b both relate to executing virtualized application 144 for the same UE 102. In some examples, if third analytics data 164c has already been received, operation 308 includes, based on at least UE ID 120, identifying that first analytics data 164a, second analytics data 164b, and third analytics data 164c all relate to executing virtualized application 144 or installed application 108 for the same UE 102.

With the different collections of analytics data thus identified as related, operation 310 includes generating an analytics report 166 based on at least both first analytics data 164a and second analytics data 164b (and in some scenarios, also third analytics data 164c). As mentioned above, analytics report 166 may differentiate between virtualized application 144 and installed application 108 (and even other virtualized applications) using application code 154 for virtualized application 144 and different application codes for installed application 108 and other virtualized applications. Flowchart 300 returns to operation 302 and analytics server 160 continues collecting and storing received analytics data.

FIG. 4 illustrates a flowchart 400 of exemplary operations associated with enabling analytics for a virtualized application. In some examples, at least a portion of flowchart 400 may each be performed using one or more computing devices 600 of FIG. 6. In operation 402, user 104 visits host node 140 with UE 102 to use virtualized application 144. In some examples, this is a cellular carrier's website, or some other service provider's or retailer's website. In operation 404, virtualized application 144 executes (launches) in virtualization environment 142. In some scenarios, user 104 performs a search for a product or service, either directly or by capability, as operation 406.

Operation 408 includes determining, by virtualized application 144, UE data set 122 including at least one data item selected from the list consisting of: UE make, UE model, a UE OS version, an MCC, an MNC, and an LAC. At least some of this information is often provided by the OS on UE 102. Operation 410 includes determining, by virtualized application 144, activity data set 124 including at least one data item selected from the list consisting of: a search term, stored cookies, and a tracked browsing history. Operation 412 includes transmitting UE data set 122 and activity data set 124 to a remote node, content management node 170. In some examples, content management node 170 is coincident with host node 140 and/or analytics server 160.

In operation 414, content management node 170 determines, based on at least UE data set 122 and activity data set 124, an application usage context 172. Application usage context 172 may be used for providing customized promotional (or other) information (as contextual information 174) to user 104 via virtualized application 144, and/or unlocking functionality (e.g., content-specific functionality 156) in virtualized application 144. In some examples, application usage context 172 includes identification that user 104 is using virtualized application 144 rather than installed application 108, and so contextual information 174 may be further customized for virtualized application 144 (e.g., providing a prompt to download installed application 108).

Operation 416 includes transmitting, to UE 102, functionality access relating to application usage context 172, for example transmitting content-specific functionality 156 itself, or a permission to access content-specific functionality 156 that may already be programmed into virtualized application 144 but has previously been locked. In some examples, content-specific functionality 156 relating to application usage context 172 comprises an executable portion of virtualized application 144. In some examples, content-specific functionality 156 relating to application usage context 172 comprises displaying contextual information 174 (e.g., promotional information) relating to application usage context 172. Operation 418 includes based on at least application usage context 172, enabling, by virtualized application 144, content-specific functionality 156 relating to application usage context 172. User 104 experiences content-specific functionality 156 relating to application usage context 172 in operation 420 through application experience 110.

In some examples, if user 104 searches on a particular service provider's name, the functionality may be an advertisement for a newer UE (e.g., since the UE 102 make may be known from UE data set 122). In some examples, if user 104 searches for cellular coverage, the functionality may be displaying a map showing coverage areas for a particular cellular carrier. Other promotional information may also be used. In some examples, virtualized application 144 may have some functionality, such as games or bill-paying capabilities made available (e.g., if user 104 is an existing customer of a service provider that operates content management node 170).

Figure 5:
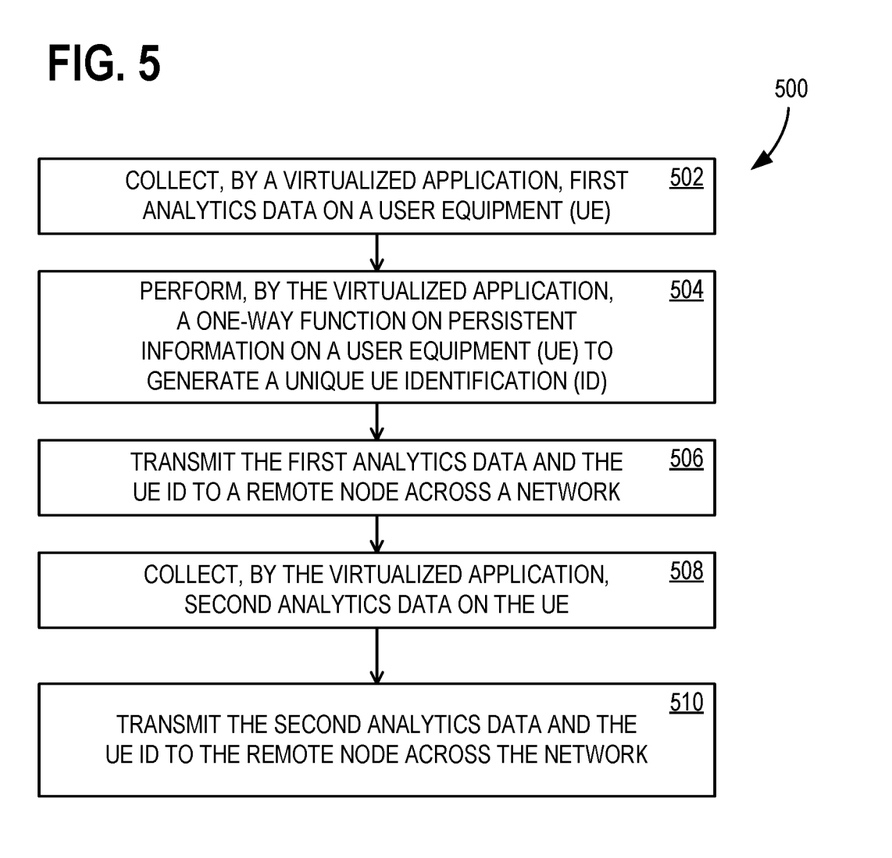
FIG. 5 illustrates another flowchart of exemplary operations that may be associated with examples of the arrangement of FIG. 1.

FIG. 5 illustrates a flowchart 500 of exemplary operations associated with enabling analytics for a virtualized application. In some examples, at least a portion of flowchart 500 may be performed using one or more computing devices 600 of FIG. 6. Operation 502 includes collecting, by a virtualized application, first analytics data on a UE. Operation 504 includes performing, by the virtualized application, a one-way function on persistent information on the UE to generate a unique UE identification (ID). Operation 506 includes transmitting the first analytics data and the UE ID to a remote node across a network. Operation 508 includes collecting, by the virtualized application, second analytics data on the UE. Operation 510 includes transmitting the second analytics data and the UE ID to the remote node across the network.

Figure 6:
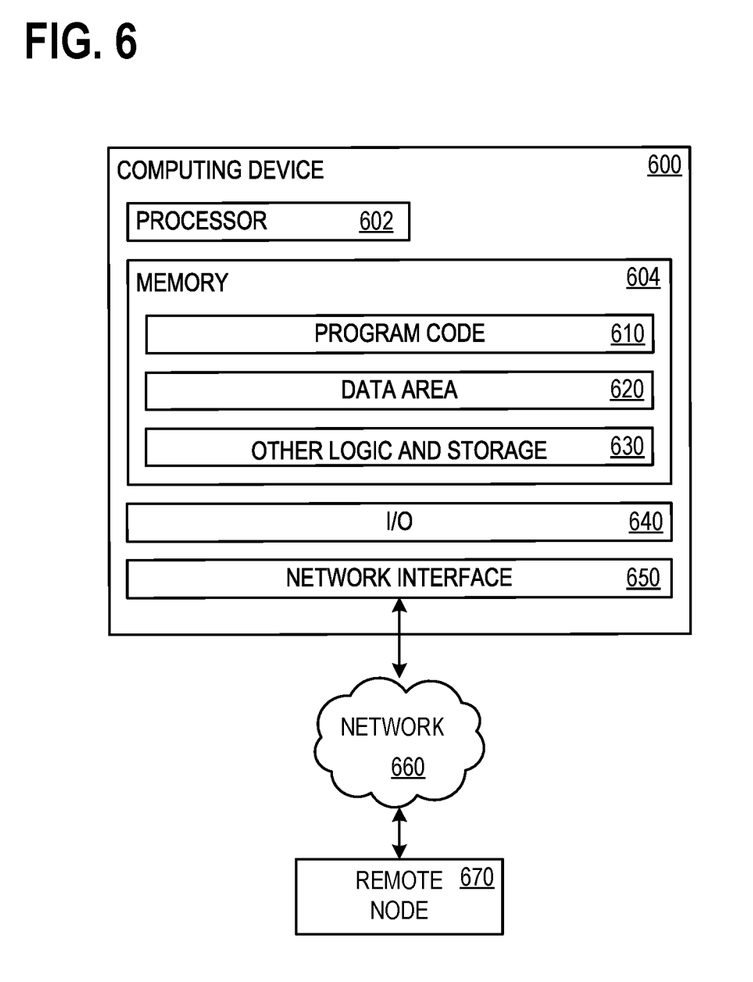
FIG. 6 illustrates a block diagram of a computing device suitable for implementing various aspects of the disclosure.

FIG. 6 illustrates a block diagram of computing device 600 that may be used as a component of arrangement 100, for example, as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600.

ADDITIONAL EXAMPLES

An example method of enabling analytics for a virtualized application comprises: collecting, by a virtualized application, first analytics data on a UE; performing, by the virtualized application, a one-way function on persistent information on the UE to generate a unique UE ID; transmitting the first analytics data and the UE ID to a remote node across a network; collecting, by the virtualized application, second analytics data on the UE; and transmitting the second analytics data and the UE ID to the remote node across the network.

An example system for enabling analytics for a virtualized application comprises: a processor; and a computer-readable medium storing instructions that are operative upon execution by the processor to: collect, by a virtualized application, first analytics data on a UE; perform, by the virtualized application, a one-way function on persistent information on the UE to generate a unique UE ID; transmit the first analytics data and the UE ID to a remote node across a network; collect, by the virtualized application, second analytics data on the UE; and transmit the second analytics data and the UE ID to the remote node across the network.

One or more example computer storage devices has computer-executable instructions stored thereon, which, upon execution by a computer, cause the computer to perform operations comprising: collecting, by a virtualized application, first analytics data on a UE; performing, by the virtualized application, a one-way function on persistent information on the UE to generate a unique UE ID; transmitting the first analytics data and the UE ID to a remote node across a network; collecting, by the virtualized application, second analytics data on the UE; and transmitting the second analytics data and the UE ID to the remote node across the network.

Alternatively, or in addition to the other examples described herein, examples include any combination of the following:
the SMS message comprises a silent SMS message;
the analytics data comprises at least one data item selected from the list consisting of: a screen with which a user is interacting, transaction information, identification of hyperlinks selected, and usage time;
the one-way function comprises a hash function;
the persistent information comprises an IMEI of the UE;
after transmitting the first analytics data and the UE ID to the remote node across the network, and prior to transmitting the second analytics data and the UE ID to the remote node across the network, performing, by the virtualized application, the one-way function on the persistent information on the UE to generate the UE ID a second time;
based on at least the UE ID, identifying that the first analytics data and the second analytics data both relate to executing the virtualized application for the same UE;
generating an analytics report based on at least both the first analytics data and the second analytics data;
collecting, by an installed application, third analytics data on the UE;
transmitting the third analytics data and the UE ID to the remote node across the network;
persisting, by the installed application, the UE ID on the UE;
storing the first analytics data and the second analytics data both indexed to the UE ID.
storing the third analytics data indexed to the UE ID.
based on at least the UE ID, identifying that the first analytics data, the second analytics data, and the third analytics data all relate to executing the virtualized application or the installed application for the same UE;
generating an analytics report based on at least the first analytics data, the second analytics data, and the third analytics data;
performing the one-way function on the persistent information on the UE to generate a unique UE ID comprises combining the persistent information on the UE with a code provided by the virtualized application;
after transmitting the first analytics data and the UE ID to the remote node across the network, and prior to transmitting the third analytics data and the UE ID to the remote node across the network, performing, by the installed application, the one-way function on the persistent information on the UE to generate the UE ID;
determining, by the virtualized application, a UE data set including at least one data item selected from the list consisting of: UE make, UE model, a UE OS version, an MCC, an MNC, and an LAC;
determining, by the virtualized application, an activity data set including at least one data item selected from the list consisting of: a search term, stored cookies, and a tracked browsing history;
transmitting the UE data set and the activity data set to a content management node;
determining, based on at least the UE data set and the activity data set, an application usage context;
transmitting, to the UE, functionality access relating to the application usage context;
the functionality access relating to the application usage context comprises an executable portion of the virtualized application;

the functionality access relating to the application usage context comprises displaying contextual information relating to the application usage context; and based on at least the application usage context, enabling, by the virtualized application, the functionality access relating to the application usage context.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
   launching execution, by a user equipment (UE), of a virtualized application located within a virtualized environment that is located on a remote node across a network from the UE;
   transmitting, by the UE, to the virtualized application, UE persistent information that is persisted on the UE;
   employing, by the UE, the virtualized application to generate first analytics data for the virtualized application;
   installing, by the UE, an installed application on the UE, wherein the virtualized application has a subset of the functionality of the installed application;
   executing, by the UE, the installed application on the UE;
   based on at least the UE persistent information, generating, by the UE, a UE identification (ID);
   collecting, by the installed application, second analytics data on the UE; and
   transmitting, by the UE, the UE ID and the second analytics data for the installed application to an analytics server across the network.

2. The method of claim 1, further comprising:
   based on at least the UE persistent information, generating, by the virtualized application. the UE ID.

3. The method of claim 1, further comprising:
   during the execution of the installed application, persisting the UE ID on the UE;
   subsequently executing, by the UE, the installed application;
   during the subsequent execution of the installed application, determining that the UE ID is persisted on the UE;
   collecting, by the installed application, third analytics data on the UE; and
   transmitting, by the UE, the UE ID and the third analytics data to the analytics server.

4. The method of claim 1, wherein the UE persistent information comprises an international mobile equipment identity (IMEI) number of the UE.

5. The method of claim 1, wherein the analytics data comprises at least one data item selected from the list consisting of:
   a screen with which a user is interacting, transaction information, identification of hyperlinks selected, and usage time.

6. The method of claim 1, wherein launching execution of the virtualized application comprises launching execution with an interne browser of the UE.

7. The method of claim 1, further comprising:
   based on at least the UE ID, determining by the analytics server that the first analytics data and the second analytics data both relate to the same UE.

8. A system comprising:
   a processor; and
   a computer-readable medium storing instructions that are operative upon execution by the processor to:
      launch execution, by a user equipment (UE), of a virtualized application located within a virtualized environment that is located on a remote node across a network from the UE;
      transmit, by the UE, to the virtualized application, UE persistent information that is persisted on the UE;
      employ, by the UE, the virtualized application to generate first analytics first analytics data for the virtualized application;
      install, by the UE, an installed application on the UE, wherein the virtualized application has a subset of the functionality of the installed application;
      execute, by the UE, the installed application on the UE;
      based on at least the UE persistent information, generate, by the UE, a UE identification (ID);
      collect, by the installed application, second analytics data on the UE; and
      transmit, by the UE, the UE ID and the second analytics data for the installed application to an analytics server across the network.

9. The system of claim 8, wherein the operations are further operative to:
   based on at least the UE persistent information, generate, by the virtualized application. the UE ID.

10. The system of claim 8, wherein the operations are further operative to:
    during the execution of the installed application, persist the UE ID on the UE;
    subsequently execute, by the UE, the installed application;
    during the subsequent execution of the installed application, determine that the UE ID is persisted on the UE;
    collect, by the installed application, third analytics data on the UE; and transmit, by the UE, the UE ID and the third analytics data to the analytics server.

11. The system of claim 8, wherein the UE persistent information comprises an international mobile equipment identity (IMEI) number of the UE.

12. The system of claim 8, wherein the analytics data comprises at least one data item selected from the list consisting of:

a screen with which a user is interacting, transaction information, identification of hyperlinks selected, and usage time.

13. The system of claim 8, wherein launching execution of the virtualized application comprises launching execution with an interne browser of the UE.

14. The system of claim 8, wherein the operations are further operative to:
based on at least the UE ID, determine by the analytics server that the first analytics data and the second analytics data both relate to the same UE.

15. One or more computer storage devices having computer-executable instructions stored thereon, which, upon execution by a computer, cause the computer to perform operations comprising:
launching execution, by a user equipment (UE), of a virtualized application located within a virtualized environment that is located on a remote node across a network from the UE;
transmitting, by the UE, to the virtualized application, UE persistent information that is persisted on the UE;
employing, by the UE, the virtualized application to generate first analytics data for the virtualized application;
installing, by the UE, an installed application on the UE, wherein the virtualized application has a subset of the functionality of the installed application;
executing, by the UE, the installed application on the UE;
based on at least the UE persistent information, generating, by the UE, a UE identification (ID);
collecting, by the installed application, second analytics data on the UE; and
transmitting, by the UE, the UE ID and the second analytics data for the installed application to an analytics server across the network.

16. The one or more computer storage devices of claim 15, wherein the operations further comprise:
based on at least the UE persistent information, generating, by the virtualized application, the UE ID; and
based on at least the UE ID, determining by the analytics server that the first analytics data and the second analytics data both relate to the same UE.

17. The one or more computer storage devices of claim 15, wherein the operations further comprise:
during the execution of the installed application, persisting the UE ID on the UE;
subsequently executing, by the UE, the installed application;
during the subsequent execution of the installed application, determining that the UE ID is persisted on the UE;
collecting, by the installed application, third analytics data on the UE; and
transmitting, by the UE, the UE ID and the third analytics data to the analytics server.

18. The one or more computer storage devices of claim 15, wherein the UE persistent information comprises an international mobile equipment identity (IMEI) number of the UE.

19. The one or more computer storage devices of claim 15, wherein the analytics data comprises at least one data item selected from the list consisting of:
a screen with which a user is interacting, transaction information, identification of hyperlinks selected, and usage time.

20. The one or more computer storage devices of claim 15, wherein launching execution of the virtualized application comprises launching execution with an internet browser of the UE.

* * * * *